No. 707,537. Patented Aug. 26, 1902.
C. BAECHLER.
FILTERING APPARATUS.
(Application filed July 22, 1901.)

(No Model.)

WITNESSES:
A. Albertine
U. Greiger

INVENTOR
Carl Baechler
BY
G. P. Ascentine
HIS ATTORNEY

UNITED STATES PATENT OFFICE.

CARL BAECHLER, OF ZURICH, SWITZERLAND.

FILTERING APPARATUS.

SPECIFICATION forming part of Letters Patent No. 707,537, dated August 26, 1902.

Application filed July 22, 1901. Serial No. 69,297. (No model.)

*To all whom it may concern:*

Be it known that I, CARL BAECHLER, a citizen of Switzerland, residing at Zurich, canton of Zurich, Switzerland, have invented a certain new and useful Improvement in Filtering Apparatus, of which the following is a description.

My invention relates to an apparatus for filtering fluids, such as milk, &c.; and the object of my invention is to provide for filtering apparatus by which milk and other fluids may be deprived of their impurities and which may be easily dismounted for cleansing. I attain this object by a mechanism shown in the accompanying drawings, in which—

Figure 1:
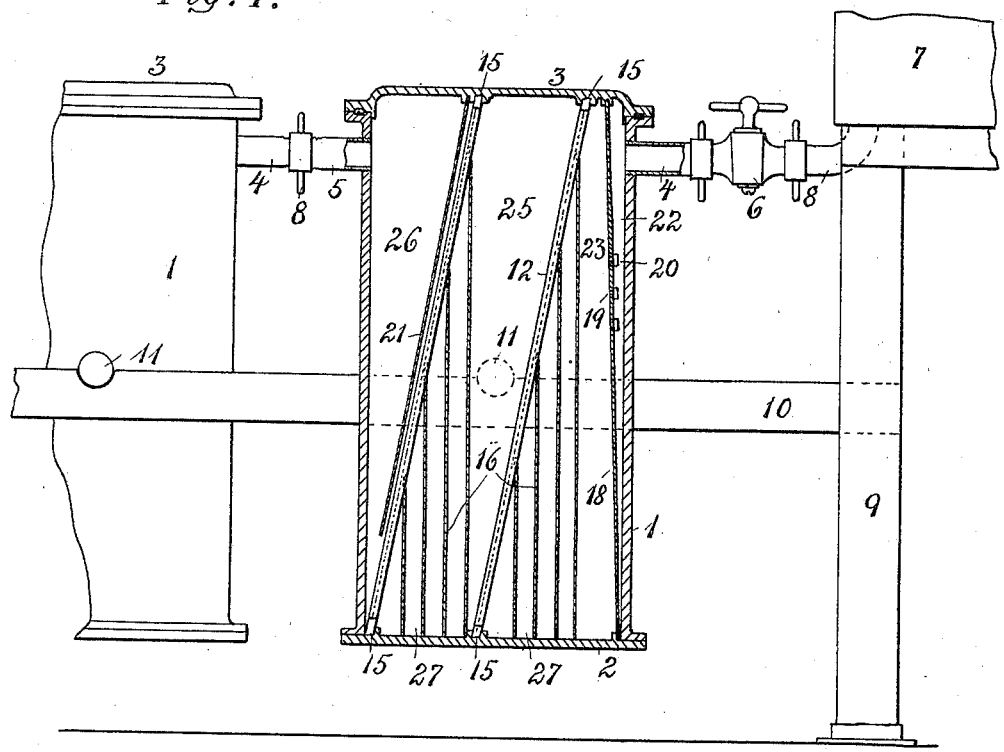
Figures 2, 3, 4, 5:
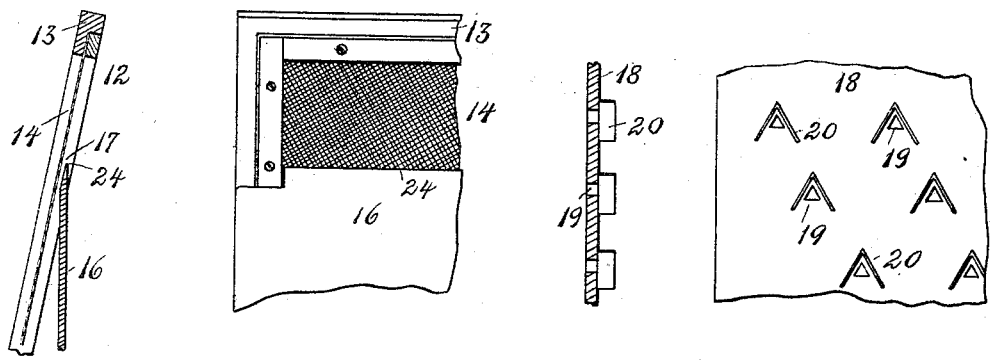

Figure 1 is a general view of the apparatus, part being in section; Figs. 2, 3, 4, and 5, detail views.

Like numbers refer to like parts throughout all figures.

Referring to the figures, 1 is a receptacle, preferably of cast-iron, tinned internally, with a bottom 2 and a cover 3 an inlet 4 and an outlet 5. A valve 6 controls the inlet of the fluid which is poured into the basin or receptacle 7. Couplings 8 are provided for connecting up the filter or joining it to a following one. The pillars 9, of which there are several, besides serving as support for the basin 7 have connected to them the rails 10, upon which the filtering apparatus are pivotally mounted by the trunnions 11.

The filter-screen 12, consisting of a frame 13 and silk gauze or any other fine-webbed fabric 14, is mounted at a slant in the receptacle 1 by means of the slots 15 in the bottom, cover, and sides in such a manner as not to allow any impurities to pass through the edges from one side of the filter-gauze to the other. 16 represents sheet-metal slabs dividing each of the compartments 23, 25, and 26, which are formed by the filter-screens and the casing 1, into subdivisions, with narrow rectangular openings 17 at the top. A further sheet-metal partition 18 is inserted in the receptacle directly before the inlet-opening. This partition has about in the middle of its height openings 19, preferably triangular, each of which is provided with a hood 20. These openings are preferably so placed that neither is directly above the other, thereby preventing particles of impurity dropping from one to pass directly in front of another opening and probably through it. A sheet-metal shield 21, reaching nearly to the bottom of the receptacle, is placed directly or near the last of the inclined filter-frames.

The operation is as follows: The milk or other fluid to be filtered is poured into the basin 7, from whence it passes by gravity through the valve 6 into the first compartment 22, from whence it flows through the openings 19. Since these openings are situated lower than the inlet 4, the fluid in its downward flow strikes the hoods 20, causing part of the heavier impurities to change the course of their direction and drop to the bottom of compartment 22. After reaching the compartment 23 the fluid again rises and is forced to pass through the narrow openings 17, striking the sharp edges 24 of the slabs 16 again, depriving the fluid of some of its coarser impurities. At the same time part of the fluid will pass through the filter-gauze 14, leaving fine particles on the inlet side of said gauze. Since the fineness of the gauze offers too great resistance for all fluid to pass through it at the top, the fluid is forced to pass all openings 17 and the entire surface of the gauze into the compartment 25. In the same manner the second or eventually third, &c., series of narrow openings and filter gauze or screen is passed until the fluid reaches the last compartment 26, from whence it either enters a second and third, &c., apparatus or is taken away for further use. The shield 21 is inserted to assure a downward flow of the fluid. The impurities drop to the lower part of the apparatus, where they may rest and not be stirred by the fluid, since the movement of the latter does not reach the lower parts of the chambers 27.

The advantages of this apparatus above others are that the fluid does not continually pass through the impurities; that by my apparatus a more thorough and rational filtering is attained. Furthermore, all parts are so situated as to be easily removed and cleansed.

I do not wish to confine myself to a special form of my apparatus, but only to the general application of the various parts.

Having thus described my invention, I claim as new and desire to secure by Letters Patent—

1. In a filtering apparatus the combination of a receptacle containing an inlet and outlet, with filter-screens dividing said receptacle into compartments, upright slabs forming narrow openings with said filter-screens, a partition containing openings, said openings having hoods directly above them, and means for connecting said apparatus to a pouring-basin, substantially as described.

2. In a filtering apparatus the combination of a receptacle containing an inlet and an outlet, said receptacle being pivotally mounted on rails attached to upright, with a filter screen or screens dividing said receptacle into compartments, upright slabs, a partition containing triangular holes, said holes having triangular hoods above them and a shield for forcing a downward flow of the fluid, substantially as described.

CARL BAECHLER.

Witnesses:
A. LIEBERKNECHT,
HEH. VÖLKLE.